United States Patent [19]
Presley et al.

[11] 3,831,679
[45] Aug. 27, 1974

[54] STIMULATION WITH INHIBITED ACIDIZING FLUIDS

[75] Inventors: C. Travis Presley; Ronald E. Smith, both of Littleton, Colo.

[73] Assignee: Marathon Oil Company, Findlay, Ohio

[22] Filed: July 5, 1973

[21] Appl. No.: 376,631

[52] U.S. Cl. .............................................. 166/307
[51] Int. Cl. ............................................. E21b 43/27
[58] Field of Search ............... 166/307, 281, 271; 252/8.55 C

[56] References Cited
UNITED STATES PATENTS

| | | | |
|---|---|---|---|
| 2,681,889 | 6/1954 | Menaul et al. | 166/307 |
| 3,233,672 | 2/1966 | Carpenter | 166/307 |
| 3,319,714 | 5/1967 | Knox | 166/307 |
| 3,353,603 | 11/1967 | Knight | 166/307 |
| 3,467,188 | 9/1969 | Gogarty | 166/274 |
| 3,474,865 | 10/1969 | Gogarty et al. | 166/274 |
| 3,572,416 | 3/1971 | Kinney et al. | 166/307 |
| 3,681,240 | 8/1972 | Fast et al. | 166/307 X |
| 3,734,186 | 5/1973 | Williams | 166/307 X |
| 3,779,916 | 12/1973 | Crowe | 166/307 X |

*Primary Examiner*—Stephen J. Novosad
*Attorney, Agent, or Firm*—Joseph C. Herring; Richard C. Willson, Jr.; Jack L. Hummel

[57] ABSTRACT

Production and injection wells are stimulated with an inhibited acidizing microemulsion containing hydrocarbon (external phase), surfactant, and acid. The acid is inhibited from reacting with the reservoir rock until it has penetrated the rock face. About 5 – 500 gallons of the microemulsion per vertical foot of formation are useful to stimulate the wells. Carbonate reservoirs are particularly suited for stimulation.

15 Claims, No Drawings

STIMULATION WITH INHIBITED ACIDIZING FLUIDS

BACKGROUND OF THE INVENTION

1. Field of the Invention

This invention relates to injecting an acidizing fluid into a subterranean reservoir via a production means or injection means, permitting the fluid to dissolve a portion of reservoir rock and thereafter returning the well to its normal operations.

2. Description of the Prior Art

Stimulation of both production and injection wells can be accomplished with acid solutions. One disadvantage with acidizing is that the acid tends to react with the reservoir rock upon initial contact. This is generally undesirable since this initial reaction can "block" or impair the movement of the acidizing fluid into the formation. It is known that the first 15 feet in radius from the wellbore is generally accountable for about 50 percent of the resistance to flow. Therefore, it is desirable to penetrate this 15 feet radius with the acid to effect more efficient stimulation. To accomplish this, the prior art has used agents to effect release of the acid at a distance from the wellbore. Patents representative of the prior art are:

Menaul et al., U.S. Pat. No. 2,681,889, stimulate wells with a composition containing an acid, an emulsifier, and an oil-soluble non-ionic surface active agent containing an ester linkage which is hydrolyzed by an acid. The emulsion breaks down releasing acid at a distance from the wellbore.

Burtch et al., U.S. Pat. No. 3,179,170 sorb an acid on or in a material such as charcoal. The acid is gradually desorbed as the charcoal is displaced through the reservoir rock.

Knight, U.S. Pat. No. 3,353,603, acidizes a well utilizing an emulsion of aqueous hydrochloric acid, an emulsifying agent and an acid retarding agent such as dodecyl benzene sulfonic acid.

Gogarty, U.S. Pat. No. 3,467,188 and U.S. Pat. No. 3,474,865, stimulates injection wells with micellar solutions containing up to 4 percent by weight of electrolyte. The electrolyte can be an inorganic acid.

U.S. Pat. No. 3,483,923 to Darley teaches acidizing wells with the combination of an aqueous acid solution and an oil emulsion.

Applicants have discovered an oil-external microemulsion which acts as an inhibited acidizing solution and which permits the penetration of a reservoir rock for significant distances to effect good acidization of the reservoir rock.

SUMMARY OF THE INVENTION

Applicants' microemulsion contains hydrocarbon, surfactant, cosurfactant, and an acid as the internal phase. About 5–100 gallons of the microemulsion per vertical foot of formation is effective to stimulate wells. The composition is an inhibited acidizing solution since the reservoir rock does not initially contact with the acid but the acid reacts with the reservoir rock as the microemulsion progresses away from the wellbore.

DESCRIPTION OF THE PREFERRED EMBODIMENTS

The microemulsion consists of a hydrocarbon external phase and an acid internal phase. Surfactant stabilizes the two phases. A minimum amount of water is incorporated into the microemulsion, only that amount contained in the acid. This composition is particularly applicable in treating gas wells where hydrate formation may constitute a problem, i.e. with these compositions you have less chance of hydrates forming in the reservoir rock.

Because the acid constitutes the internal phase of the microemulsion, the acid is protected from contact with the rock surface and occurs over a longer period of time. This allows deeper penetration of the acidizing liquid into the porous rock and a longer acid reaction time, the combination results in a more efficient and productive acid treatment.

The microemulsion contains about 25 to about 75% and preferably about 30 to about 65% and more preferably about 35 to about 60% of hydrocarbon; about 10 to about 40% and preferably about 20 to about 35% and more preferably about 25 to about 30% of surfactant; about 5 to about 15% and preferably about 6 to about 12.5% and more preferably about 8 to about 12% of acid and optionally about 1 to about 50% and preferably about 5 to about 40% and more preferably about 10 to about 30% of an alcohol.

The hydrocarbon can be any hydrocarbon as long as it is not substantially reactive with the acid. It can be a paraffinic crude oil, a refined fraction of a crude oil, such as gas oil, naphtha, diesel fuel, kerosene, gasoline, or a refined fraction of crude oil such as "finished" gasoline, jet fuel, etc. The hydrocarbon is preferably an aliphatic hydrocarbon containing an average of about 6 to about 40 carbon atoms. The hydrocarbon can contain substituted groups such as halide, $-CH_3, -SR''$, $-NR_2'', -CONR_2'', -CO_2R'', -COR'', -OR'', -SO_3R''$, $-SO_2-, -SO-, -PO_3R'', -NHCOR''$, where $R''$ may be hydrogen or lower alkyl or aryl. These substituent groups may be present as long as they do not produce deleterious effect upon the microemulsion stability. The hydrocarbon can be unreacted hydrocarbon within the surfactant incorporated into the microemulsion.

The surfactant used is an alkaryl sulfonate. It can be a pure sulfonate or a crude sulfonate such as petroleum sulfonate. The alkaryl sulfonates can obtain about 1 to about 30 carbon atoms in the alkyl group, about 6 to about 18 carbon atoms in the aryl group, and the salt of the sulfonate is preferably an alkali metal or ammonium salt. The surfactant is preferably a petroleum sulfonate having an average equivalent weight of about 400 to about 550 and preferably about 400 to about 500 and more preferably about 420 to about 470. The petroleum sulfonate can contain unreacted hydrocarbon which is useful as the hydrocarbon within the microemulsion. Examples of sulfonates include Atlas G3300, marketed by Atlas Chemical Co., ICI America Inc. Wilmington, Del., and defined as an alkylaryl sulfonate (HLB = 11.7).

The alcohol is an aliphatic alcohol containing about 2 to about 16 or more carbon atoms and preferably about 2 to about 12 and more preferably about 3 to about 8 carbon atoms. The alcohol can be a primary, secondary or tertiary alcohol. Also, the alcohol can contain more than one hydroxyl group and can contain other functional groups such as epoxy, oxy, chloro, fluoro, amine and amide; e.g. the alcohol can be an ethoxylated aliphatic alcohol.

The acid can be hydrochloric acid, hydrofluoric acid or like acid. Maximum concentration of the acid in the microemulsion is desired, e.g. the hydrochloric acid can be 38% HCl and up to 50% by weight of HF in the acid solution. The other components, as mixed within the microemulsion, should not be substantially reactive with the particular acid.

The volume of the microemulsion injected into the reservoir will depend upon the depth or thickness of the reservoir rock to be stimulated. Both carbonate and sandstone reservoir rocks can be treated, treatment of carbonate rock being preferred. Generally about 5 to about 500 and preferably about 50 to about 400 and more preferably about 100 to about 300 gallons of the microemulsion per vertical foot of reservoir rock is useful to obtain good results. The microemulsion can be injected in front of or behind another slug, the slug can be acid or a surfactant slug, or a combination of different types of slugs. The microemulsion slug can be followed by hydrocarbon and/or water to displace it out into the reservoir.

The microemulsion can contain other additives to impart desired properties, e.g. corrosion inhibitors, bactericides, scale inhibitors, etc. These additives should not adversely affect the properties of the microemulsion.

The viscosity of the microemulsion is preferably less than that of the formation fluids within the reservoir to be stimulated. Such permits the microemulsion to be propagated out into the reservoir with minimum surface energy. If it is desired to have a uniformly treated reservoir rock, then the viscosity of the microemulsion is preferably about equal to that of the formation fluids so that the microemulsion will uniformly displace the formation fluids as the microemulsion enters and progresses through the reservoir rock.

It may be desired to precede the microemulsion of this invention with a miscible or miscible-like slug to clean the reservoir rock. Also, the stimulation can be effected by first injecting the microemulsion into the reservoir rock and thereafter fracturing the reservoir. There are many different methods of improving stimulation that are known in the art and it is intended that these methods be incorporated within the scope of the invention as defined herein.

The following examples teach specific working embodiments of the invention. Unless otherwise specified, all percents are based on volume.

EXAMPLE 1

A microemulsion having good acidizing properties is obtained by mixing 65 mls. decane, 30 mls. of an alkaryl sulfonate (Atlas G-3300) and 10 mls. of concentrated hydrochloric acid (37–38% HCl).

EXAMPLE 2

A microemulsion having good acidizing properties is obtained by mixing 36% decane, 38% normal amyl alcohol, 14% of alkaryl sulfonate (Atlas G3300) and 11% of concentrated hydrochloric acid (37–38% HCl).

EXAMPLE 3

0.75 g of calcium carbonate is contacted with 100 mls. of 4% aqueous solution of hydrochloric acid. Within 20 seconds, the acid had reacted with the calcium carbonate, i.e. liberation of gas by the reaction was completed.

EXAMPLE 4

100 ml of the microemulsion defined in Example 1 is contacted with 0.75 grams of calcium carbonate. The following data are representative of the reaction:

TABLE I

| Time(secs) | Volume of Gas Liberated (mls) |
|---|---|
| 20 | 37 |
| 50 | 50 |
| 80 | 67 |
| 100 | 85 |
| 300 | 102 |
| 800 | 111 |
| 1700 | 135 |
| 2100 | 136 |

EXAMPLE 5

A mixture of 10 mls. concentrated HCl, 10 mls. water, 30 mls. G-3300, and 60 mls. decane proved to be an unstable microemulsion. Calcium carbonate (0.75 g) was contacted with 100 mls of the unstable mixture described above.

| Time (sec) | Volume of Gas Liberated (mls) |
|---|---|
| 20 | 65 |
| 40 | 90 |
| 60 | 115 |
| 100 | 129 |

This example is included to illustrate that the stability of the oil-external microemulsion is important in inhibiting the acidizing action of the fluid.

EXAMPLE 6

A hydrocarbon containing carbonate reservoir, 30 feet thick, is in fluid communication with an injection well. About 6,000 gallons of the microemulsion of Example 2 are injected into the reservoir and displaced out into the reservoir by injecting water behind the microemulsion. The injection well is returned to normal use and increased injectivity rates are realized.

It is not intended that the invention be limited by the specifics taught above. Rather, it is intended that all equivalents be incorporated within the scope of the invention as defined within the specification and appended claims.

What is claimed is:

1. A process of stimulating a well in fluid communication with a hydrocarbon-containing reservoir rock comprising injecting into the reservoir about 5 to about 500 gallons of a microemulsion per vertical foot of hydrocarbon-containing formation, the microemulsion being comprised of about 25 to about 75% hydrocarbon, about 10 to about 40% of an alkaryl sulfonate, and about 5% to about 15% acid.

2. The process of claim 1 wherein the hydrocarbon is a substantially paraffinic hydrocarbon.

3. The process of claim 1 wherein the acid is hydrochloric acid or hydrofluoric acid.

4. The process of claim 1 wherein the sulfonate is a petroleum sulfonate having an average equivalent weight of about 400 to about 550.

5. The process of claim 1 wherein about 1% to about 50% of a aliphatic alcohol is incorporated into the microemulsion.

6. The process of claim 1 wherein the formation is a carbonate formation.

7. The process of claim 1 wherein the well is an injection well.

8. The process of claim 1 wherein water is injected behind the microemulsion to displace it out into the reservoir.

9. A process of increasing the injectivity index of an injection well in fluid communication with a hydrocarbon-bearing, carbonate formation comprising injecting into the formation about 5 to about 500 gallons of a microemulsion per vertical foot of carbonate formation, the microemulsion being comprised of about 25 to about 75% of a substantially paraffinic hydrocarbon, about 10 to about 40% of a petroleum sulfonate having an average equivalent weight of about 400 to about 550, and about 5% to about 15% of hydrochloric or hydrofluoric acid.

10. The process of claim 9 wherein about 5% to about 40% of an aliphatic alcohol containing about 3 to about 16 carbon atoms is incorporated into the microemulsion.

11. The process of claim 9 wherein the microemulsion contains about 35 to about 65% by volume hydrocarbon.

12. The process of claim 9 wherein the sulfonate concentration is about 20% to about 35%.

13. The process of claim 9 wherein the acid is hydrochloric acid and contains up to about 38% HCl.

14. The process of claim 9 wherein the acid is hydrofluoric acid and contains up to about 50% by weight of HF.

15. The process of claim 9 wherein the microemulsion contains about 6% to about 12.5% of acid.

* * * * *